United States Patent Office 2,707,673
Patented May 3, 1955

2,707,673

METHOD OF TREATING FURNACE CARBON BLACK

Carl W. Sweitzer, Garden City, and Paul J. Melore, Brooklyn, N. Y., assignors to Columbian Carbon Company No Drawing. Application March 9, 1949,
Serial No. 80,573

2 Claims. (Cl. 23—209.1)

The present invention relates to carbon blacks and, more particularly, to carbon blacks of the type known as furnace carbons. It provides a novel and very useful carbon black product having a unique combination of characteristics. It further provides a novel process whereby the product may, with advantage, be produced.

In the copending applications Serial No. 80,571, filed March 9, 1949, now abandoned, of one of us, filed concurrently herewith and the continuation-in-part thereof Ser. No. 322,589, filed November 25, 1952, there is described and claimed a novel process whereby furnace carbons may be fully oxidized to a pH value of 2.5 to 3.5 without appreciable loss in weight by burning and without change in particle size or surface area. Also, in the copending application Serial No. 80,572, of one of us, filed concurrently herewith, there is described and claimed a modification of the process of the first noted applications whereby a furnace carbon having a fully oxidized surface but of more intense blackness and greatly increased surface area, oil absorption and iodine adsorption characteristics may be produced.

We have now discovered that, by a further modification of these processes, whereby the product of intensified blackness is subjected to heating to a temperature of 1,800 to 2,000° F. in a non-oxidizing atmosphere, its iodine value may be extraordinarily further increased. For instance, in applying our present invention to a furnace carbon which has been treated in accordance with the application Serial No. 80,572 to an extent such as to obtain maximum color value, on the ABC color scale, we may increase its iodine adsorption to heretofore unknown values for any type of carbon black, including the most finely divided which have notoriously high iodine adsorption values.

According to the process of the applications Serial No. 80,571 and Ser. No. 322,589, a furnace carbon is uniformly heated as a shallow bed of a thickness not exceeding about ¼ inch in the presence of air to a temperature in the black-heat range of the particular carbon, but not below 650° F. Temperatures well below the ignition temperature of the furnace carbon may be employed but, advantageously, the temperature should be only sufficiently below the ignition temperature to avoid localized glowing, or bright spots. This temperature will vary somewhat with the particular furnace black treated and whether or not steam is admixed with the air. The maximum temperature possible without glowing is usually most advantageous as the required heating time is thereby minimized. In general, where substantial proportions of steam are mixed with the air, e. g., 10–25% by volume, oxidizing temperatures approximately 50° higher than permissible with air alone may, with advantage, be employed. In place of steam, it is sometimes desirable to use carbon dioxide gas. Extensive study of a wide variety of furnace carbons has indicated invariably that the oxidizing temperature should not exceed 1,100° F., and with most furnace blacks should not exceed 1,000° F., if ignition of the carbon is to be avoided.

By this treatment, we have found that furnace blacks may be oxidized to such an extent as to develop pH characteristics as low as about 2.5, ranging between 2.5 and 3.5, depending upon the particular furnace carbon treated, with no appreciable loss in weight or reduction in particle size.

As above indicated, optimum treating time is dependent upon treating temperatures employed. The oxidation rate increases with an increase in temperature with a proportionate decrease in treating time. The optimum treating time for any particular furnace carbon at a given oxidizing temperature is readily determined by periodically sampling the black being oxidized and testing the sample for pH characteristics. At maximum surface oxidation, the pH characteristic of the black will reach a minimum, usually about 2.5. In some instances, the minimum attainable pH has been found to range as high as 3.5. When the minimum attainable pH value is reached the treatment should be immediately discontinued for if the period of treatment be continued beyond this point, loss in weight of the furnace black will result. By said process, the surface of the black may be fully oxidized without appreciable loss in weight, but if the treatment be continued further, the fully oxidized black is slowly consumed without further decrease in pH characteristics. However, to effect these results, it is essential that the operating temperature be kept below the ignition temperature of the black.

The process may be carried out by heating the black in shallow beds, not exceeding ¼ inch in thickness, to the desired black-heat temperature, while passing air or a mixture of air and steam over the black. The treatment may be carried out in shallow trays in a heated oven.

According to the present invention, furnace carbon which had been fully oxidized at black-heat temperature by the process just described, is subjected to further or continued treatment in an oxidizing atmosphere, as described, to a substantial weight loss, not less than 5–10%, prior to heating in the absence of air, in accordance with our present invention. This further treatment, as described in the application Serial No. 80,572, comprises continuing the treatment just described at black-heat temperature until a substantial loss in weight of the treated carbon has resulted. During such continued treatment, the pH characteristics of the carbon, as developed at the point of full surface oxidation, remains substantially constant, but the color becomes gradually blacker, the oil absorption characteristics gradually become higher and the iodine adsorption increases rapidly. A loss in weight is also observed, but this loss in weight is far less than that experienced in conventional methods of oxidizing channel blacks to effect a comparable color change. This stage of the treatment may be discontinued when the desired color, oil absorption and iodine adsoprtion characteristics have been attained. We have found, however, that the maximum development of these characteristics is generally attained at the point where approximately 50% by weight of the black has been consumed. Where a furnace carbon of maximum iodine adsorption value is desired, this intermediate stage of the treatment should be carried to the point of maximum development of these characteristics before subjecting the black to the final deactivation stage of treatment, in accordance with the present invention. It will be understood, however, that the invention contemplates operation in which the intermediate stage is discontinued before maximum development of color, oil absorption and iodine adsorption is attained.

According to one advantageous procedure for carrying out the process, a furnace black which has been completely oxidized without loss in weight as described, and the oxidation then continued to a 50% loss in weight, as also described, is placed in a refractory tube, advantageously a silica tube, capable of holding a vacuum. The tube charged with the black is first heated, with at least one end of the tube open, until all volatile matter has been driven off. The open end of the tube is then closed and the heating continued for the required period of time. Even more advantageously, the tube is subjected to subatmospheric pressure during this latter heating period.

Following the heating period, the black is allowed to cool out of contact with oxygen, advantageously under vacuum. In place of vacuum, the black may be permitted to cool in an inert atmosphere but this is not necessary if precautions are taken to prevent entry of oxygen into the tube during the cooling of the black.

The temperature and duration of the heating necessary to drive off the volatile matter are, to a considerable extent, interdependent and may vary somewhat with the particular black being treated. In general, black should be heated to a temperature within the range of 1800° to 2,000° F. for a period within the range of 5 to 30 minutes. During this treating period, there is a substantial loss in weight of the black, usually within the range of 10 to 15%, due to the driving off of volatile matter, including oxygen acquired by the black during the preceding oxidation treatement. Treating periods of from 7 to 15 minutes have usually been found sufficient for the purposes of the present invention.

The invention will be further described and illustrated and its effectiveness demonstrated by the following specific example of its application to a high modulus furnace carbon. A portion of untreated furnace carbon having an ignition temperature of about 1,000° F. was heated in a thin bed to a black-heat temperature of 950° F. while passing air by natural draft over the bed until it had lost 50% of its weight. Two separate samples of the black so treated were then further treated by heating separately to about 1,800° F. for seven minutes in the absence of air. The characteristics of the furnace carbon before treatment, at the intermediate stages and of the two samples taken after the deactivation treatment are set forth in the following Table I.

*Table I*

|  | pH | Color | Oil Absorption | Iodine Adsorption ×10⁻⁵ |
|---|---|---|---|---|
| Before | 9.8 | 93 | 11.2 | 26 |
| Intermediate (no weight loss) | 2.4 | 93 | 11.2 | 26 |
| Intermediate (50% weight loss) | 2.4 | 150 | 20.0 | 181 |
| Sample #1 | 6.8 | 150 | 24.1 | 304 |
| Sample #2 | 8.8 | 157 | 25.6 | 323 |

The product was of intense blackness having an ABC color number at least as high as, or higher than, the intermediate black and had an amazingly high iodine adsorption equivalent, much higher than that of any other carbon of which we are aware.

The ABC color number herein referred to is determined by the method described in the article by Sweitzer and Goodrich, appearing in Rubber Age for August 1944, pages 469–478. The oil absorption values appearing herein were determined by the stiff paste method described on page 475 of the same article. The pH characteristics herein noted were determined by the method described in Industrial Engineering Chemistry, volume 29, page 953 (1937).

The iodine adsorption values noted herein were determined by the following method: 2 grams of the carbon to be tested is shaken for 2 hours with 100 cc. of an 0.4 N iodine solution in benzene. The mixture is then filtered through a Watman #2 filter paper and an aliquot 20 cc. portion of the filtrate is titrated against 0.2 N aqueous sodium thiosulfate solution, using starch indicator and Daxad as a dispersing agent. The iodine adsorption value is expressed as equalvents of $I_2$ per gram of the carbon tested.

A second furnace black, having an ignition temperature of about 1,000° F. but other characteristics quite different from that used in the foregoing example, was similarly heated in a current of air until there had been a weight loss of 8.3%. At this point a sample was taken and the remainder of the black heated in the absence of air for sixty minutes at a temperature of 1,800° F. and a further sample taken. The characteristics of the original furnace carbon before treatment and of the intermediate and final samples are set forth in the following Table II.

*Table II*

| Sample | pH | Color | Oil Absorption | Iodine Adsorption ×10⁻⁵ |
|---|---|---|---|---|
| Original | 8.8 | 112 | 16.5 | 61 |
| Intermediate | 3.4 | 125 | 16.5 | 96 |
| Final | 9.2 | 126 | 20.8 | 178 |

Thus, by varying the extent or intensity of the intermediate treatment, the characteristics of the final product may be varied over a considerable range as desired, particularly with respect to iodine adsorption characteristics and oil absorption characteristics.

It will be understood that the terms "furnace black" and "furnace blacks" appearing in the appended claims are to be interpreted to include lamp blacks.

The product resulting from the preferred embodiment of the present invention is characterized by a pH characteristic within the range of 8 to 10, preferably about 9, and an ABC color number within the range of 140 to 160, a stiff paste oil absorption value of 20 to 30 gallons per 100 pounds in conjunction with an iodine adsorption value of 250 to 350 equivalents per gram×10⁻⁵, a blue tone and a volatile content not in excess of 3%, by weight. The oil absorption may, however, range from 11 to 25 gallons per 100 pounds and the ABC color may range from 95 to 175 depending upon the particular black treated and the severity of the treatment.

We claim:

1. A process for the treatment of furnace blacks which comprises uniformly heating a quiescent, shallow bed of furnace black, of a thickness not exceeding about ¼ inch, to a black-heat temperature not lower than 650° F. but below the ignition temperature of the particular black, no portion of the bed of black being permitted to exceed a black-heat temperature, while passing air over, and in contact with, the surface of the bed of heated black, and continuing the treatment until the surface area of the furnace black particles has been completely oxidized as indicated by the minimum pH characteristic within the range of 2.5 to 3.5, continuing the treatment until at least 5%, but not in excess of 75%, of the black by weight has been consumed without ignition then subjecting the resultant black to deactivation by heating in a non-oxidizing atmosphere at a temperature within the range of 1,800° to 2,000° F. until a substantial proportion of the oxygen absorbed on the surface of the carbon during the preliminary treatment has been driven off and cooling the black out of contact with free oxygen.

2. A process for the treatment of furnace blacks which comprises uniformly heating a quiescent, shallow bed of black, of a thickness not exceeding about ¼ inch, to a black-heat temperature not lower than 650° F. but below the ignition temperature of the particular black and not exceeding 1,100° F., no portion of the bed of black being permitted to exceed a black-heat temperature, while passing air over and in contact with the surface of the bed of heated black until the surface area of the particles of the black has been completely oxidized, as indicated by the minimum obtainable pH characteristics within the range of 2.5 to 3.5, continuing the treatment until about 50% of the black by weight has been consumed without ignition, then subjecting the resultant black to deactivation by heating in a non-oxidizing atmosphere at a temperature within the range of 1,800° to 2,000° F. until a substantial proportion of the oxygen absorbed on the surface of the carbon during the preliminary treatment has been driven off and cooling the black out of contact with free oxygen.

References Cited in the file of this patent

UNITED STATES PATENTS

| | | |
|---|---|---|
| Re. 19,664 | Damon et al. | Aug. 13, 1935 |
| 2,144,971 | Heller et al. | Jan. 24, 1939 |
| 2,342,862 | Hemminger | Feb. 29, 1944 |
| 2,393,106 | Johnson et al. | Jan. 15, 1946 |
| 2,479,708 | Amon | Aug. 23, 1949 |
| 2,486,205 | Prosk | Oct. 25, 1949 |
| 2,499,438 | Wiegand et al. | Mar. 7, 1950 |

FOREIGN PATENTS

| | | |
|---|---|---|
| 118,922 | Australia | Sept. 21, 1944 |

OTHER REFERENCES

Sweitzer et al.: The Rubber Age, vol. 55, No. 5, August 1944, pages 469–478.